Aug. 21, 1951  R. E. BOLDUC  2,565,166
THEFTPROOF CAP STRUCTURE FOR FILL PIPES
Filed Nov. 19, 1948
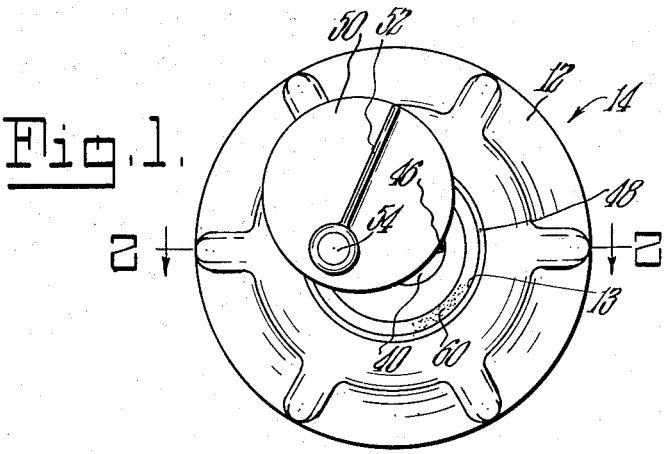
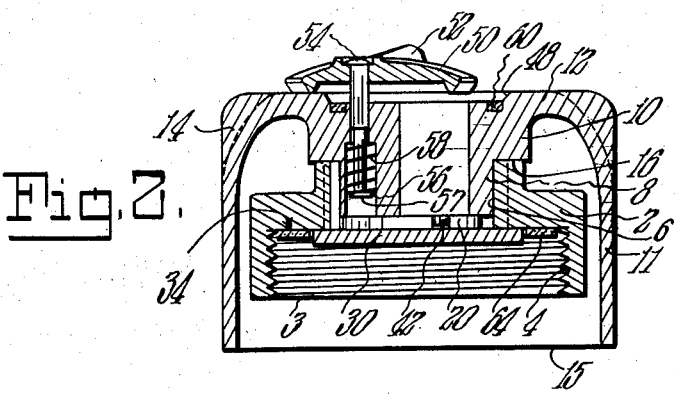
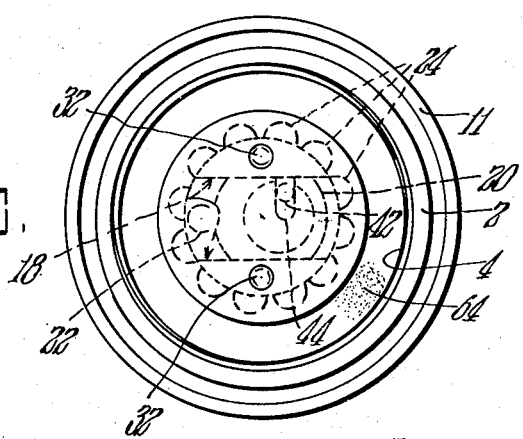
INVENTOR.
Russell E. Bolduc.
BY Ross & Ross
Attys.

Patented Aug. 21, 1951

2,565,166

UNITED STATES PATENT OFFICE 2,565,166

THEFTPROOF CAP STRUCTURE FOR FILL PIPES

Russell E. Bolduc, Chicopee Falls, Mass., assignor to Bolduc Manufacturing Co. Inc., Springfield, Mass., a corporation of Massachusetts Application November 19, 1948, Serial No. 61,089

1 Claim. (Cl. 70—165)

This invention relates to a theft proof structure for the fill pipe of a tank or the like.

The principal object of the invention is the provision of a structure wherein the cap member for the fill pipe of a tank may not be removed by unauthorized persons.

It is well known that it is a common occurrence for the cap of a fill pipe of an automobile or truck gas tank to be removed for the theft of the contents of the tank.

According to this invention, a novel structure is provided wherein a cap is secured to the fill pipe which may not be unscrewed except when a housing for the cap is locked thereto. When the housing is not locked to the cap, the housing is free to rotate on the cap without disturbing its securement to the fill pipe.

With the foregoing and various other novel features and advantages and other objects of my invention as will become more apparent as the description proceeds, the invention consists in certain novel features of construction and in the combination and arrangement of parts as will be hereinafter more particularly pointed out in the claim hereunto annexed and more fully described and referred to in connection with the accompanying drawings wherein:

Fig. 1 is a plan view of a theft proof structure embodying the novel features of the invention;

Fig. 2 is a sectional elevational view on the line 2—2 of Fig. 1; and

Fig. 3 is an inverted plan view of the structure shown in Figs. 1 and 2.

Referring now to the drawings more in detail, the invention will be fully described.

A cap 2 is provided which is internally threaded as at 4 for screwing onto the upper threaded end of a fill tank or the like. The threading may be of various dimensions for fitting various fill pipes if desired.

Coaxial with the internal threads of the cap, the said cap is provided with a bore 6 which receives a cylindrical part 8 of a hub 10 depending downwardly from the upper wall 12 of a housing 14.

The cap is freely rotatable on the part 8 and its upper side abuts a shoulder 16 of the housing. The lower face of the hub part 8 is provided with a transverse slot 18 in which a bolt 20 is slidable back and forth. The bolt is provided with a pawl 22 and the bore of the cap is provided with a plurality of recesses 24 in which the pawl 22 is receivable.

A plate 30 is secured to the lower end of the hub part 8 in any suitable manner as by pins or screws 32 and this plate bears against an inner surface 34 of the cap to hold the cap and housing against axial separation and to retain the bolt 20 in its slot.

A lock 40 is provided in the housing which may be of any ordinary form having a pin 42 which is oscillatable between locking and unlocking positions. The pin 42 is disposed in a slot 44 of bolt 20. The lock keyhole is shown as 46 in Fig. 1 and as the key is inserted in the lock and turned in one direction or the other, the pin 42 is oscillated to move the bolt to engage and disengage the pawl 22 with the recesses 24 of the cap.

As shown, the lock 40 is exposed in an opening 13 of the housing and said opening preferably has a bevelled edge 48.

A closure 50 is provided which has a transverse manually engageable rib 52. A pivot member 54 extends through the closure and downwardly into a bore 56 of the hub of the housing. A spring 58 surrounds the member 54 between an end 57 of the pin and the upper end of the bore so that the closure 50 is urged downwardly.

The peripheral edge of the closure is preferably made complemental to the bevel 48 so that it seats thereon and against a packing 60, see Fig. 2. A packing 64 is provided around the member 30 of the cap.

A peripheral skirt 11 extends downwardly from the wall 12 of the housing and is slightly spaced from the cap 2, the lower edge 15 of the skirt being disposed at a distance below the lower edge 3 of said cap.

In use the cap is screwed onto the upper threaded end of a fill pipe with a backing or gasket 64 against the end of said pipe. Normally the bolt 20 is in unlocking position where the pawl 22 thereof is out of engagement with the recesses 24 of the cap. In this position of the parts, the housing is freely rotatable relative to the cap 20 so that on its being turned it will not unscrew the cap.

When it is desired to remove the cap, the lock is operated so that the pin thereof moves the bolt outwardly for the engagement of the pawl 22 with a recess 24, then as the housing is rotated the cap is rotated thereby and unscrewed from the fill pipe.

The closure when in closed position seals the opening in the upper wall and protects the lock and, as stated, is urged by the spring into closed seated position. The skirt 13 may extend below the cap to any desired extent and prevents insertion of any implement which might otherwise be used to unscrew the cap from the fill pipe.

The invention may be embodied in other specific forms without departing from the essential characteristics thereof. Hence, the present embodiments are therefore to be considered in all respects merely as being illustrative and not as being restrictive, the scope of the invention being indicated by the appended claim rather than by the foregoing description, and all modifications and variations as fall within the meaning and purview and range of equivalency of the appended claim are therefore intended to be embraced therein.

What it is desired to claim and secure by Letters Patent of the United States is:

A locking cap construction for the open threaded end of a fill pipe comprising in combination, a cap having an upwardly extending vertical threaded bore for receiving a threaded fill pipe terminating in an upper horizontal inner surface and having an upper portion provided with an upper vertical bore extending upwardly from said inner surface and threaded bore to an upper horizontal face of said cap, a housing having an upper horizontal wall and an upper hub depending therefrom terminating in a lower cylindrical portion in the vertical bore of the cap and on which said cap is rotatable, a plate secured to the lower end of the cylindrical portion of the hub of said housing adjacent the inner surface of the threaded bore thereof holding the upper horizontal face of said cap against the hub of said housing and preventing axial separation of said cap and housing, the lower face of the cylindrical portion of the housing provided with a transverse slot extending horizontally thereacross, a bolt reciprocable in opposite directions in said slot between locking and unlocking positions having a pawl on one end thereof, said upper vertical bore of the cap provided with a plurality of recesses therearound for receiving said pawl, a lock extending through the upper wall and hub of said housing having a pin oscillatable at the lower end thereof and said bolt having a slot in which said pin is disposed whereby said bolt is reciprocated by said pin, and said housing provided with a peripheral skirt depending from the upper wall thereof around and closely adjacent the periphery of said cap and having a lower edge disposed in a plane below the plane of the lower edge of said cap.

RUSSELL E. BOLDUC.

REFERENCES CITED

The following references are of record in the file of this patent:

UNITED STATES PATENTS

| Number | Name | Date |
| --- | --- | --- |
| 1,702,532 | Boomer et al. | Feb. 19, 1929 |
| 1,908,593 | Fortune | May 9, 1933 |
| 2,135,351 | Nehls | Nov. 1, 1938 |
| 2,467,087 | Konchan | Apr. 12, 1949 |

FOREIGN PATENTS

| Number | Country | Date |
| --- | --- | --- |
| 757,683 | France | Oct. 16, 1933 |